United States Patent
Tan et al.

(10) Patent No.: US 10,957,066 B2
(45) Date of Patent: Mar. 23, 2021

(54) SYSTEMS AND METHODS FOR LOCATING HUMANS USING DYNAMIC FIELD ROBOTIC-SENSOR NETWORK OF HUMAN ROBOT TEAM

(71) Applicant: General Electric Company, Schenectady, NY (US)

(72) Inventors: Huan Tan, Clifton Park, NY (US); Li Zhang, Clifton Park, NY (US); Yakov Polishchuk, Niskayuna, NY (US); Bo Wang, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 93 days.

(21) Appl. No.: 16/357,868

(22) Filed: Mar. 19, 2019

(65) Prior Publication Data

US 2020/0302633 A1 Sep. 24, 2020

(51) Int. Cl.
*G06T 7/70* (2017.01)
*G06T 7/292* (2017.01)
(Continued)

(52) U.S. Cl.
CPC ............ *G06T 7/70* (2017.01); *G06K 9/00369* (2013.01); *G06K 9/6288* (2013.01); *G06T 7/292* (2017.01);
(Continued)

(58) Field of Classification Search
CPC .... A61B 2034/2051; A61B 2034/2055; G05D 1/0246; G05D 1/0088; G06T 2207/30244; G06T 2200/04; G06T 7/246; G06T 7/70
See application file for complete search history.

(56) References Cited

U.S. PATENT DOCUMENTS 7,668,338 B2  2/2010  Yoon et al.
8,068,935 B2  11/2011  Kanayama
(Continued)

FOREIGN PATENT DOCUMENTS

| CN | 103399637 A | 11/2013 |
| CN | 105773633 B | 4/2018 |
| KR | 20070061218 A | 6/2007 |

OTHER PUBLICATIONS

Isobe, Yuzuka et al., "Human Following with a Mobile Robot Based on Combination of Disparity and Color Images", IEEE Xplore, Nov. 27-29, 2014, (pp. 01-05, 5 toal pages).
(Continued)

*Primary Examiner* — Dung Hong
(74) *Attorney, Agent, or Firm* — Buckley, Maschoff & Talwalkar LLC

(57) ABSTRACT

A system including at least three robots. Each robot including a proximity sensor unit and an imaging device. At least one robot including a processor to perform a method of estimating a pose of a human, the method including obtaining a first pose estimate for the human, the first pose estimate based on proximity sensor information, obtaining a second pose estimate for the human, the second pose estimate based on imaging device information, and generating a refined pose estimate for the human by fusing the first pose estimate with the second pose estimate, where the first pose information provides predictive values and the second pose estimate provides correction values. The method including applying a deep neural network (DNN) human model, and applying a DNN human pose model. A method to generate a refined pose estimation for a human and a non-transitory computer readable medium are also disclosed.

17 Claims, 4 Drawing Sheets

(51) Int. Cl.
    *G06K 9/00*             (2006.01)
    *G06K 9/62*             (2006.01)
    *G01S 13/74*           (2006.01)
    *G01S 15/74*           (2006.01)

(52) U.S. Cl.
    CPC .............. *G01S 13/74* (2013.01); *G01S 15/74* (2013.01); *G06T 2207/10024* (2013.01); *G06T 2207/10028* (2013.01); *G06T 2207/20084* (2013.01); *G06T 2207/30196* (2013.01)

(56) References Cited

U.S. PATENT DOCUMENTS

| | | | |
|---|---|---|---|
| 8,467,992 B1* | 6/2013 | Doyle ................... | G01S 17/89 |
| | | | 702/167 |
| 8,559,673 B2 | 10/2013 | Fairfield et al. | |
| 9,014,848 B2 | 4/2015 | Farlow et al. | |
| 9,120,227 B2 | 9/2015 | Zheng et al. | |
| 9,691,151 B1* | 6/2017 | Anderson-Sprecher ..................... | |
| | | | G06T 7/251 |
| 9,915,947 B1* | 3/2018 | LaForge ............... | G05D 1/0278 |
| 2017/0072563 A1* | 3/2017 | Anderson-Sprecher ..................... | |
| | | | G01B 11/14 |
| 2017/0097232 A1* | 4/2017 | Anderson-Sprecher ..................... | |
| | | | B25J 5/007 |
| 2019/0095716 A1* | 3/2019 | Shrestha ............... | G08B 21/187 |
| 2020/0226434 A1* | 7/2020 | Li ......................... | G06K 9/6214 |
| 2020/0226787 A1* | 7/2020 | Tsunashima ........... | G06T 7/246 |

OTHER PUBLICATIONS

Wang, Mengmeng et al., "Real-time 3D Human Tracking for Mobile Robots with Multisensors" ResearchGate, Sep. 2016, (pp. 01-07, 7 total pages).

* cited by examiner

SYSTEMS AND METHODS FOR LOCATING HUMANS USING DYNAMIC FIELD ROBOTIC-SENSOR NETWORK OF HUMAN ROBOT TEAM

BACKGROUND

Human-robot teaming and/or collaboration is applicable to military, industrial, services and other domains. During the collaboration process, robots need to estimate the position/orientation of human peers in the environment, either globally or locally. Based on the positional estimation results, robots can plan the collaborative actions according to the intention recognition and situation identification results. Advances in locating a human in an indoor environment considerable. Conventional approaches and solutions use stationery sensors placed within the environ, and a sensor located on the human team member(s). Proximity sensory signals are analyzed, and frequently triangulated, to determine the pose of a human.

In a dynamic outdoor environment, the conventional approach of advance installation of stationery sensors is impractical and unrealizable. Sensors mounted on robot team member can be in motion and positionally unknown at any instant of time, which increases the challenge for conventional approaches.

FIG. 1 illustrates a conventional approach to locating the position of human (H) using sensors S1, S2, S3, S4, S5. Conventional approaches require that human (H) be within a perimeter (P) defined by the sensors' positions. If the human(s) is not within this perimeter, conventional approaches cannot locate the person(s).

DESCRIPTION

Embodying systems and methods provide a human-robotic teaming system capable of estimating human team member pose in a positionally dynamic environment regardless of whether the human(s) is located within, or without, of a perimeter formed by robotic-mounted sensors. A positionally dynamic environment occurs when one or more team members (human, robot, or both), change positions. In accordance with embodiments, the robotic teaming system can estimate the human(s) pose indoors and outdoors Because embodying systems and methods do not require that humans be within the sensor perimeter, human-robot teaming can be achieved in a new, and/or unknown, environment. Embodying systems and methods provide the ability to track human team members in robustly different environments. In accordance with implementations, sensors can be stationary and/or mounted on robots. The stationary sensors can be placed by the human-robotic team on arrival, or the stationary sensors can be placed in advance of the team's arrival.

Figure 1:
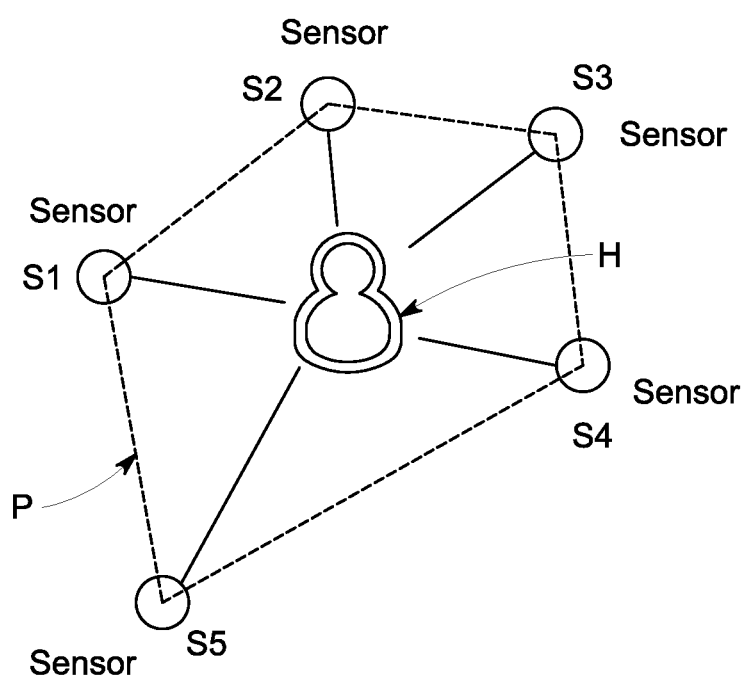
FIG. 1 illustrates a conventional approach to locate a human's position using sensors.
Figure 2:
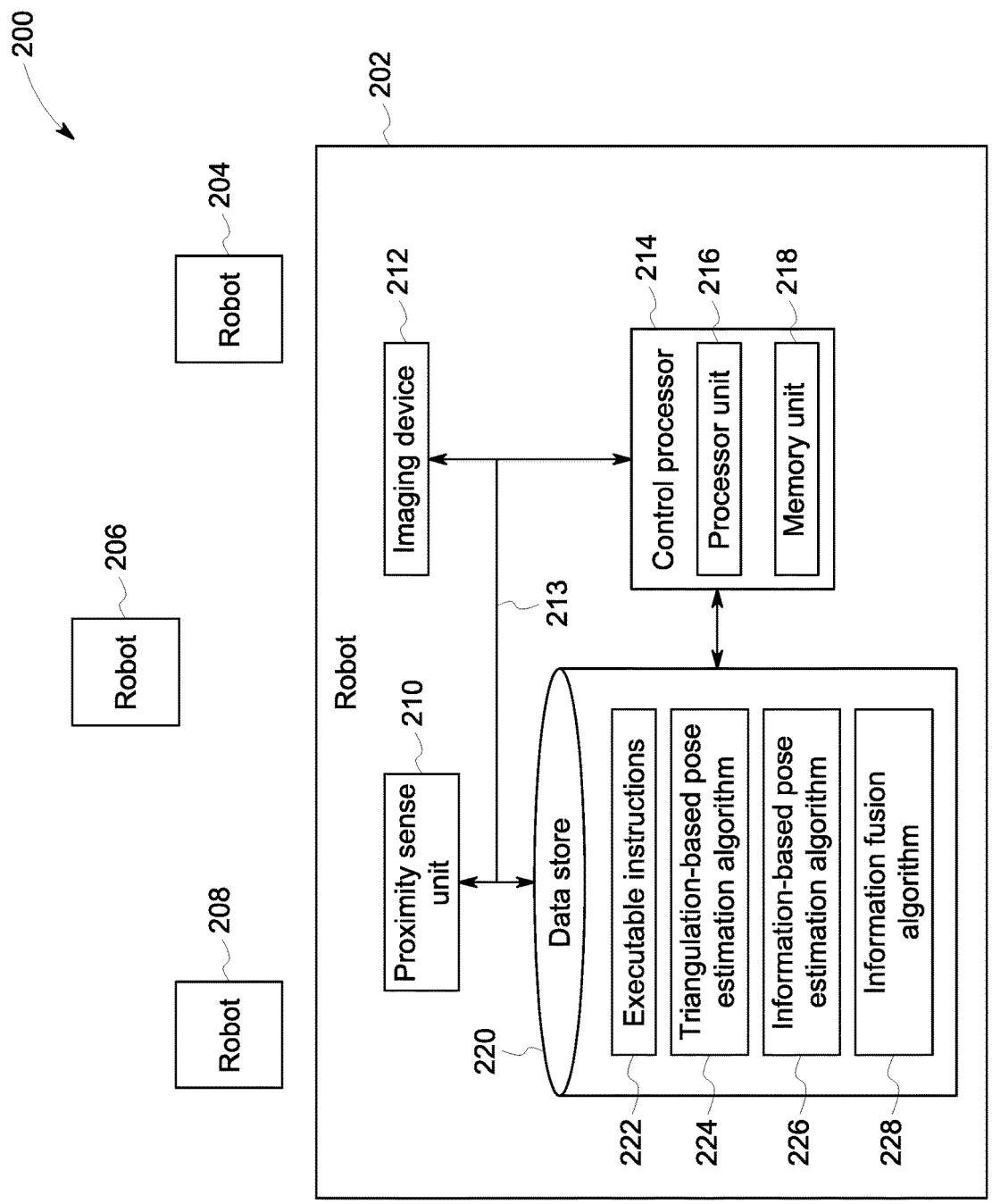
FIG. 2 illustrates a human-robotic teaming system capable of estimating human team member pose in a dynamic environment in accordance with embodiments.

FIG. 2 illustrates human-robotic teaming system 200 that is capable of estimating human team member pose in a dynamic environment in accordance with embodiments. Human robotic teaming system 200 can include robotic team members 202, 204, 206, 208. Robotic team members can be mobile (via wheels, tracts, legs) to be re-positional in the dynamic environment. It should be readily understood that embodying systems and methods are not limited to four robotic team members, but can operate with any number of robotic team members ($\geq 3$). A perimeter can be established by three or more robotic team members.

Each robotic team member can include proximity sensor unit 210 to provide distance values between team members, and imaging device 212. Control processor 214 can include processor unit 216 and memory unit 218. The control processor can be in direct communication with data store 220. In accordance with embodiments, data store 220 can be implemented by memory unit 218. Memory unit 218 can provide the control processor with local cache memory. In some implementations, the control processor can be in indirect communication with the data store across an electronic communication network if the data store is remotely located. Internal data/control bus 213 interconnects the robot components.

Processor unit 216 can execute executable instructions 222, which can cause the processor unit to perform one or more algorithms to locate, track, and/or follow human team members in accordance with embodiments. Embodying methods can implement (i) triangulation-based pose estimation algorithm 224 using proximity sensor data; (ii) RGB-D information-based pose estimation algorithm 226 using deep learning mechanisms; and (iii) sensory information fusion algorithm 228 using extended Kalman filter.

The proximity sensor unit can include a reader that transmits a signal to be received by receivers located in the proximity sensor unit of other team members, and reads positional and identification information sent in response from the team members. The proximity sensor unit can be a radio frequency tag or a ultrasonic tag with a transmitter and a receiver. The response from each proximity sensor unit can be encoded or encrypted, contain a unique identifier, and include distance information.

Each robotic-mounted proximity sensor can read a radio frequency tag or a ultrasonic tag co-located with the human team members (e.g., on equipment, clothing, utility belt, tattooed or imprinted, etc.). Similarly, each robotic-mounted proximity sensor can be read by other robotic-mounted proximity sensors.

The imaging device can be implemented in the visual spectrum with black and white or color capabilities, or in other spectrums (e.g., infrared, microwave, millimeter, x-ray, etc.). In some implementations, the imaging device can include depth sensing capability (e.g., a RGB-D or stereo camera). The imaging device can be mounted on a pan-tilt platform that provides two-degrees of freedom.

Distance matrix I can be used to describe the results.

$$D^{rr} = \begin{Vmatrix} D^{rr}_{1,1} & D^{rr}_{1,2} & D^{rr}_{1,3} & D^{rr}_{1,4} & D^{rr}_{1,5} \\ D^{rr}_{2,1} & D^{rr}_{2,2} & D^{rr}_{2,3} & D^{rr}_{2,4} & D^{rr}_{2,5} \\ D^{rr}_{3,1} & D^{rr}_{3,2} & D^{rr}_{3,3} & D^{rr}_{3,4} & D^{rr}_{3,5} \\ D^{rr}_{4,1} & D^{rr}_{4,2} & D^{rr}_{4,3} & D^{rr}_{4,4} & D^{rr}_{4,5} \\ D^{rr}_{5,1} & D^{rr}_{5,2} & D^{rr}_{5,3} & D^{rr}_{5,4} & D^{rr}_{5,5} \end{Vmatrix} \quad \text{Distance Matrix I}$$

Where, $D^{rr}_{i,j}$ represents the distance between robot i and robot j, which is read by robot i.

Figure 3:
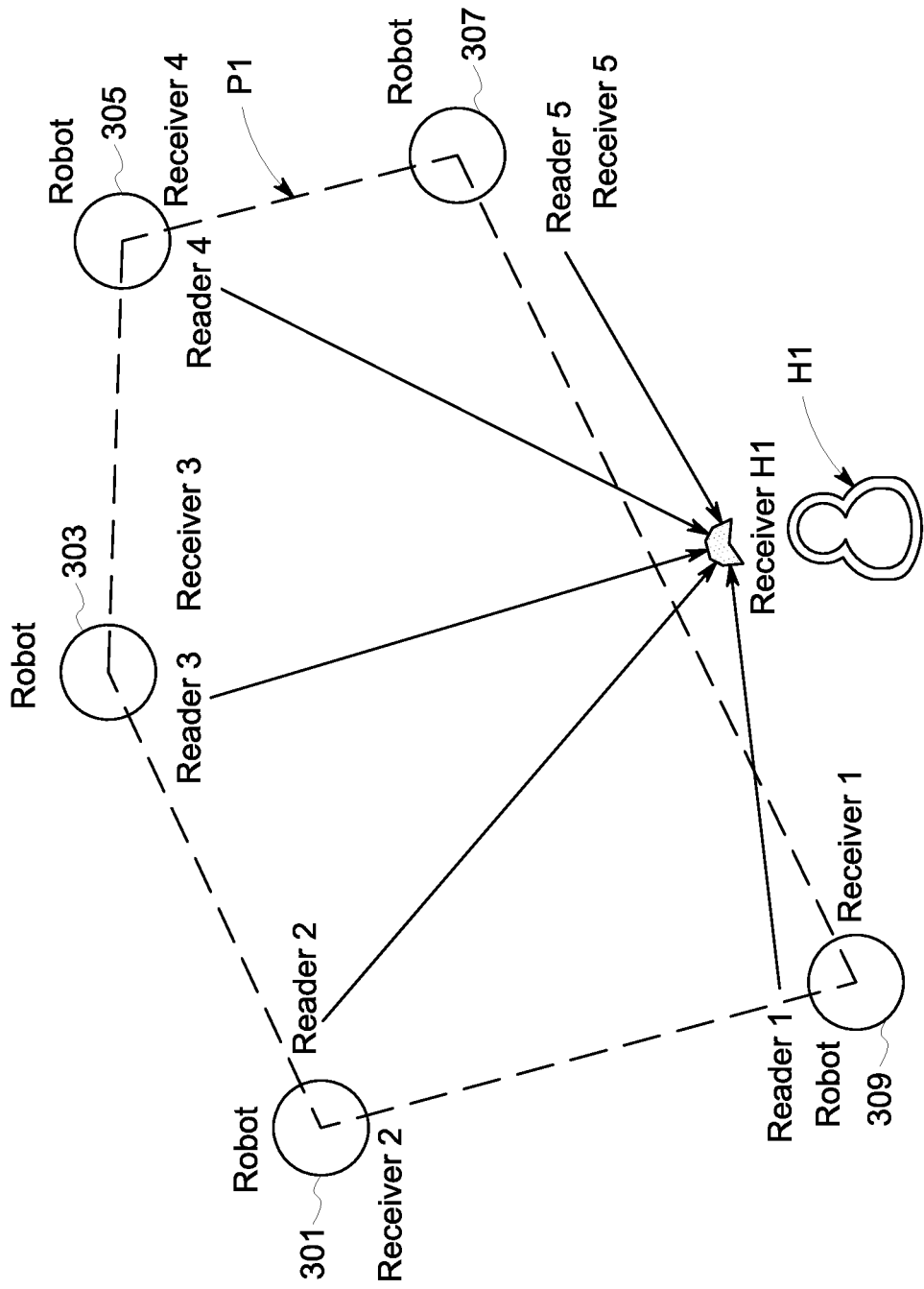
FIG. 3 illustrates a positional configuration between robotic team members and a human team member in accordance with embodiments.

FIG. 3 illustrates a positional configuration between robotic team members 301, 303, 305, 307, 309 and human (H1) team member. Each robotic team member includes a reader and a receiver. Human team members need only include a receiver, which responds to an interrogation signal from the reader of each robotic team member. FIG. 3 illustrates that the human team member is outside of perimeter (P1) defined by the robotic team member positions.

The distance between the human and robotic team members are generated by all the robotic team members. Distance Matrix II can be used to describe the results.

$$D^{rh} = \begin{Vmatrix} \|D^{rh}_{1,h}\| \\ \|D^{rh}_{2,h}\| \\ \|D^{rh}_{3,h}\| \\ \|D^{rh}_{4,h}\| \\ \|D^{rh}_{5,h}\| \end{Vmatrix} \quad \text{Distance Matrix II}$$

Where, each element $D^{rh}_{i,h}$ represents the distance between robot i and the human, which is generated by robot i.

Figure 4:
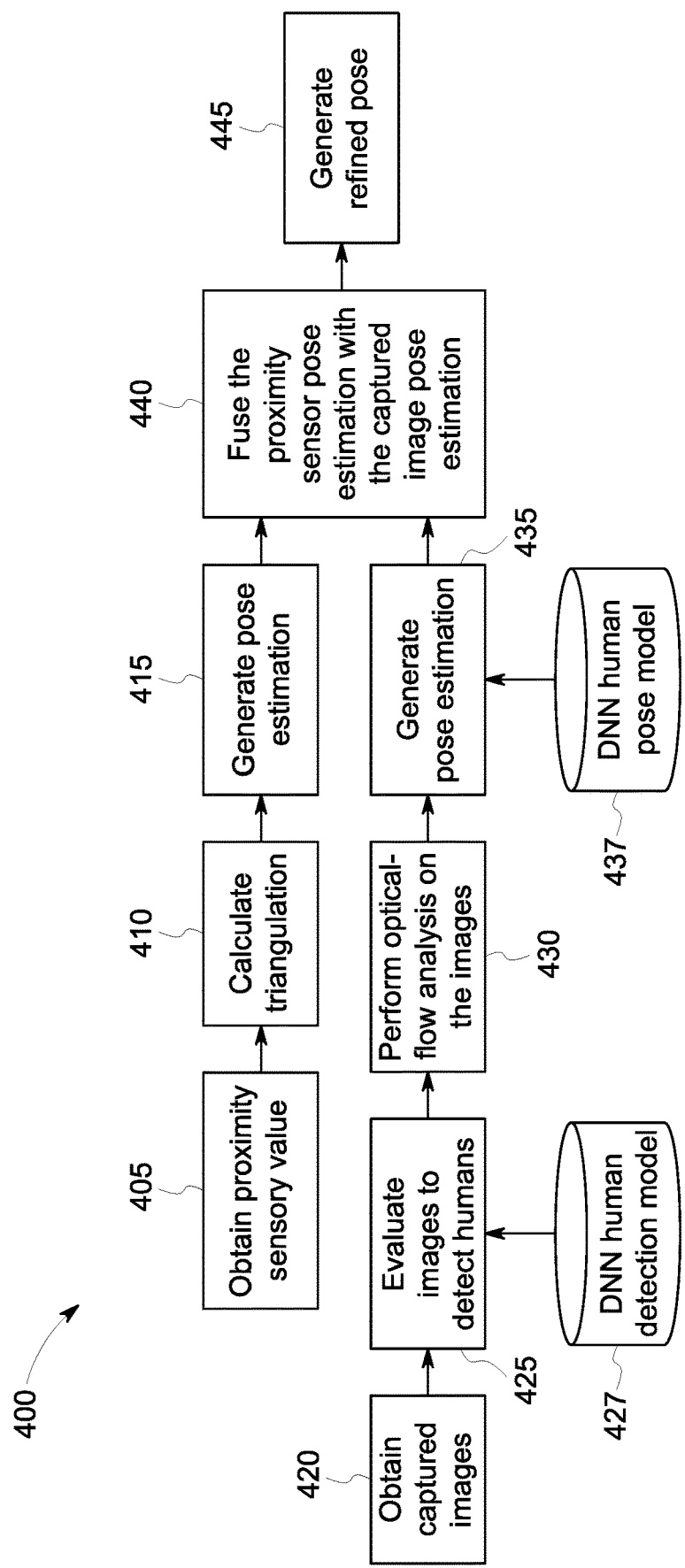
FIG. 4 illustrates a flow diagram for a process of estimating human team member pose in a dynamic environment in accordance with embodiments.

FIG. 4 illustrates process 400 for estimating human team member pose of a human-robot team in a dynamic environment in accordance with embodiments. As an overview, process 400 fuses two pose estimations to obtain a refined pose estimation for the location of the human team member. One pose estimation is formed from proximity sensor information (i.e., steps 405, 410, 415). The other pose estimation is formed from imaging device information (i.e., steps 420, 425, 430, 435).

Proximity sense values are obtained, step 405 from proximity sensor unit 210. These values can be elements of Distance Matrix II. A triangulation calculation is performed, step 410, on distance vales from at least three robotic readers. The triangulation calculation result can generate, step 415, a pose estimation for receiver H1 (FIG. 3) located at a human member of the human-robot team.

Images captured by imaging device 212 are obtained, step 420. In some implementations, the captured images can include RGBD sensor values. The captured images are evaluated, step 425, to determine whether there is humans are depicted within the images. Deep neural network (DNN) human detection model 427 can be applied in performing the detection of humans in the environment. The DNN human detection model can include generating a mask over the detected human depictions within the image. In some implementations, the DNN human detection model can also distinguish allies and enemies using visual clues present in the images (e.g., uniform silhouettes, emblems, weapon recognition, insignia, etc.).

An optical flow-based analysis is performed, step 430, on the images that include human depictions. This optical-flow analysis tracks the human depiction(s) between subsequent images. By distinguishing between stationary and non-stationary (e.g., human) components depicted in the images, the optical-flow utilizes less memory and processing time to track the human components of the images.

A pose estimation based on captured images is generated, step 435. This pose estimation can utilize an expectation-maximization (EM) mechanism to combine the results of step 425 and step 430 to provide a robust tracking result.

Deep neural network (DNN) human pose model 437 can be applied to the imaging information to determine the human pose estimation.

The proximity sense pose estimation (step 415) and the captured image pose estimation (step 435) can be fused, step 440, to generate a fused pose estimation that is an improvement over the two individual pose estimates. An extended Kalman filter can be used to fuse the two pose estimation results from the two pose estimation pipelines (i.e., steps 405, 410, 415 and steps 420, 425, 430, 435). In accordance with embodiments, the proximity sense pose estimation can be used as predictive values, and the captured image pose estimation can be used as correction values, when fusing the two estimation pipelines. In accordance with embodiments, the human team member pose estimation can be determined without the need for the human member to be within the robotic-team member perimeter. It should be readily understood that embodying systems and methods can estimate the pose of a human team member within the perimeter, outside the perimeter, and transitioning from one side (internal/external) of the perimeter to the other.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable program instructions that when executed may instruct and/or cause a controller or processor to perform methods discussed herein such as a method of pose estimation for human team members in a positionally dynamic environment independent of the human's positional relationship to a perimeter formed by robotic-mounted sensors, as disclosed above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware has been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A system comprising:
   at least three robots;
   each robot including:
   a proximity sensor unit and an imaging device;
   at least one robot including a processor in communication with a data store, the proximity sensor unit, and the imaging device across an internal bus;
   the data store containing executable instructions that cause the processor to perform a method of estimating a pose of a human, the method including:
   obtaining a first pose estimate for the human, the first pose estimate based on proximity sensor information;
   obtaining a second pose estimate for the human, the second pose estimate based on imaging device information;

generating a refined pose estimate for the human by fusing the first pose estimate with the second pose estimate, the first pose information providing predictive values and the second pose estimate providing correction values; and determining the refined pose estimate is outside a perimeter formed by respective positions of the at least three robots.

2. The system of claim 1, the proximity sensor including:
a reader and a receiver;
the reader configured to transmit a first interrogation signal; and
the receiver configured to respond to a second interrogation signal by transmitting a response signal containing positional.

3. The system of claim 1, including the data store implemented in a memory unit included in the robot.

4. The system of claim 1, the executable instructions causing the processor to obtain the first pose estimate by:
acquiring a distance value for each respective one of the at least three robots and a distance for a receiver located at the human; and
triangulating the acquired distance values to determine the first pose estimate.

5. The system of claim 1, the executable instructions causing the processor to obtain the second pose estimate by:
obtaining images from each respective one of the at least three robots;
evaluating each image to determine if a human is depicted in the image;
tracking movement of the depicted human between subsequent images by performing an optical flow analysis on each image determined to depict a human; and
generating the second pose estimate by utilizing an expectation-maximization technique.

6. The system of claim 5, including the executable instructions causing the processor to evaluate each image by applying a deep neural network human detection model.

7. The system of claim 5, including the executable instructions causing the processor to perform the optical flow analysis by distinguishing between stationary and non-stationary objects.

8. The system of claim 5, including the executable instructions causing the processor to generate the second pose estimate by applying a deep neural network human pose model.

9. A method including:
obtaining a first pose estimate for a human, the first pose estimate based on proximity sensor information;
obtaining a second pose estimate for the human, the second pose estimate based on imaging device information;
generating a refined pose estimate for the human by fusing the first pose estimate with the second pose estimate, the first pose information providing predictive values and the second pose estimate providing correction values; and
determining the refined pose estimate is outside a perimeter formed by respective positions of the at least three robots.

10. The method of claim 9, including obtaining the first pose estimate by:

acquiring a distance value for each respective one of at least three robots and a distance for a receiver located at the human; and
triangulating the acquired distance values to determine the first pose estimate.

11. The method of claim 9, including obtaining the second pose estimate by:
obtaining images from each respective one of the at least three robots;
evaluating each image to determine if a human is depicted in the image;
tracking movement of the depicted human between subsequent images by performing an optical flow analysis on each image determined to depict a human; and
generating the second pose estimate by utilizing an expectation-maximization technique.

12. The method of claim 11, including evaluating each image by applying a deep neural network human detection model.

13. The method of claim 11, performing the optical flow analysis by distinguishing between stationary and non-stationary objects.

14. The method of claim 11, including generating the second pose estimate by applying a deep neural network human pose model.

15. A non-transitory computer-readable medium having stored thereon executable instructions which when executed by a processor cause the processor to perform a method comprising:
obtaining a first pose estimate for a human, the first pose estimate based on proximity sensor information;
obtaining a second pose estimate for the human, the second pose estimate based on imaging device information;
generating a refined pose estimate for the human by fusing the first pose estimate with the second pose estimate, the first pose information providing predictive values and the second pose estimate providing correction values; and
determining the refined pose estimate is outside a perimeter formed by respective positions of the at least three robots.

16. The non-transitory computer-readable medium of claim 15, including executable instructions which cause the processor to obtain the first pose estimate by:
acquiring a distance value for each respective one of at least three robots and a distance for a receiver located at the human; and
triangulating the acquired distance values to determine the first pose estimate.

17. The non-transitory computer-readable medium of claim 15, including executable instructions which cause the processor to obtain the second pose estimate by:
obtaining images from each respective one of the at least three robots;
evaluating each image to determine if a human is depicted in the image;
tracking movement of the depicted human between subsequent images by performing an optical flow analysis on each image determined to depict a human; and
generating the second pose estimate by utilizing an expectation-maximization technique.

* * * * *